(12) United States Patent  (10) Patent No.: US 8,020,804 B2
Yoeli  (45) Date of Patent: Sep. 20, 2011

(54) GROUND EFFECT VANES ARRANGEMENT

(75) Inventor: Raphael Yoeli, Tel-aviv (IL)

(73) Assignee: Urban Aeronautics, Ltd., Yavne (IL)

( * ) Notice: Subject to any disclaimer, the term of this patent is extended or adjusted under 35 U.S.C. 154(b) by 300 days.

(21) Appl. No.: 12/224,549

(22) PCT Filed: Mar. 1, 2007

(86) PCT No.: PCT/IL2007/000271
§ 371 (c)(1),
(2), (4) Date: Nov. 4, 2008

(87) PCT Pub. No.: WO2007/099543
PCT Pub. Date: Sep. 7, 2007

(65) Prior Publication Data
US 2009/0084907 A1    Apr. 2, 2009

Related U.S. Application Data

(60) Provisional application No. 60/777,543, filed on Mar. 1, 2006.

(51) Int. Cl.
*B64C 27/20* (2006.01)
*B64C 29/00* (2006.01)
(52) U.S. Cl. ............... 244/23 D; 244/12.5; 244/23 C; 180/117
(58) Field of Classification Search ............ 244/12.1, 244/12.2, 12.3, 12.4, 12.5, 12.6, 23 R, 23 A, 244/23 B, 23 C, 23 D, 53 B; 180/116, 117
See application file for complete search history.

(56) References Cited

U.S. PATENT DOCUMENTS

| 1,287,076 | A | 12/1918 | Moses |
| 2,077,471 | A | 4/1937 | Fink |
| 2,138,999 | A | 12/1938 | Clark |
| 2,242,201 | A | 5/1941 | Woods |
| 2,273,724 | A | 2/1942 | Nelson et al. |

(Continued)

FOREIGN PATENT DOCUMENTS

EP    0 236583    9/1987

(Continued)

OTHER PUBLICATIONS

Corrected Written Opinion and Search Report of the International Searching Authority in International Application No. PCT/IL07/01475 (now WO 2008/065664 A2) (Yoeli) dated Jul. 27, 2009.

(Continued)

*Primary Examiner* — Rob Swiatek
(74) *Attorney, Agent, or Firm* — Nixon & Vanderhye, P.C.

(57) ABSTRACT

A vehicle, particularly a VTOL air vehicle, includes a duct carried by the vehicle frame with the longitudinal axis of the duct perpendicular to the longitudinal axis of the vehicle frame; a propeller rotatably mounted within the duct about the longitudinal axis of the duct to force an ambient fluid therethrough from its inlet at the upper end of the duct through its exit at the lower end of the duct, and thereby to produce an upward lift force applied to the vehicle, and a plurality of spaced vanes mounted to and across the inlet and exit ends of the duct about axes substantially perpendicular to the longitudinal axis of the duct and selectively operational to produce a desired horizontal control force in addition to the lift force applied to the vehicle.

30 Claims, 8 Drawing Sheets

U.S. PATENT DOCUMENTS

| | | | |
|---|---|---|---|
| D155,004 S | 8/1949 | Gluhareff |
| 2,709,947 A | 6/1955 | Woods |
| 2,734,705 A | 2/1956 | Robertson |
| 2,777,649 A | 1/1957 | Williams |
| 2,812,636 A | 11/1957 | Kadosch et al. |
| 2,899,149 A | 8/1959 | Breguet |
| 2,930,544 A | 3/1960 | Howell |
| 2,936,969 A | 5/1960 | Griffith et al. |
| 2,939,649 A | 6/1960 | Shaw |
| 2,951,661 A | 9/1960 | Dorman et al. |
| 2,955,780 A | 10/1960 | Hulbert |
| 2,968,453 A | 1/1961 | Bright |
| 2,973,921 A | 3/1961 | Price |
| 2,975,676 A | 3/1961 | Butler |
| 2,988,301 A | 6/1961 | Fletcher |
| 3,033,493 A | 5/1962 | Wilde et al. |
| 3,039,537 A | 6/1962 | Heidelberg |
| 3,082,977 A | 3/1963 | Arlin |
| 3,088,695 A | 5/1963 | Clark |
| 3,090,581 A | 5/1963 | Einarsson |
| 3,244,246 A | 7/1963 | Weiland |
| 3,116,898 A | 1/1964 | Clark et al. |
| 3,136,500 A | 6/1964 | Kerry |
| 3,139,244 A | 6/1964 | Bright |
| 3,161,374 A | 12/1964 | Allred et al. |
| 3,167,273 A | 1/1965 | Calderon |
| 3,174,573 A | 3/1965 | Chaplin |
| 3,179,353 A | 4/1965 | Peterson |
| 3,179,354 A | 4/1965 | Alvarez-Calderon |
| 3,181,810 A | 5/1965 | Olson |
| 3,184,183 A | 5/1965 | Piasecki |
| 3,187,817 A | 6/1965 | Colley |
| 3,198,082 A | 8/1965 | Kerris |
| 3,201,067 A | 8/1965 | Meyerhoff |
| 3,203,645 A | 8/1965 | Shaw |
| 3,223,354 A | 12/1965 | Seibold et al. |
| 3,224,712 A | 12/1965 | Taylor et al. |
| 3,231,221 A | 1/1966 | Platt |
| 3,262,511 A | 7/1966 | Carr |
| 3,262,657 A | 7/1966 | Anker-Holth |
| 3,265,329 A | 8/1966 | Postelson-Apostolescu |
| 3,276,528 A | 10/1966 | Tucknott et al. |
| 3,289,977 A | 12/1966 | Staats |
| 3,383,074 A | 5/1968 | Coplin |
| 3,384,327 A | 5/1968 | Postelson-Apostolescu |
| 3,397,852 A | 8/1968 | Katzen |
| 3,397,854 A | 8/1968 | Reyle |
| 3,454,238 A | 7/1969 | Goodson |
| 3,463,420 A | 8/1969 | Butler et al. |
| 3,481,559 A | 12/1969 | Postelson-Apostolescu |
| 3,519,224 A | 7/1970 | Boyd et al. |
| 3,559,921 A | 2/1971 | Timperman |
| 3,580,530 A | 5/1971 | Wada |
| 3,584,810 A | 6/1971 | Velton |
| 3,606,208 A | 9/1971 | Postelson-Apostolescu |
| 3,614,030 A | 10/1971 | Moller |
| 3,627,235 A | 12/1971 | Lippisch |
| 3,665,809 A | 5/1972 | Walker et al. |
| 3,713,748 A | 1/1973 | Langley |
| 3,752,417 A | 8/1973 | Lagace |
| 3,827,527 A | 8/1974 | Bertelsen |
| 3,873,049 A | 3/1975 | Horsdal |
| 3,904,155 A | 9/1975 | Chavis |
| 3,912,201 A | 10/1975 | Bradbury |
| 3,955,780 A | 5/1976 | Postelson |
| 3,972,490 A | 8/1976 | Zimmermann et al. |
| 4,022,405 A | 5/1977 | Peterson |
| 4,043,421 A | 8/1977 | Smith |
| 4,149,688 A | 4/1979 | Miller, Jr. |
| 4,194,707 A | 3/1980 | Sharpe |
| 4,469,294 A | 9/1984 | Clifton |
| 4,505,442 A | 3/1985 | Kirsch et al. |
| 4,505,443 A | 3/1985 | Bradfield et al. |
| 4,537,372 A | 8/1985 | Forizs |
| 4,598,890 A | 7/1986 | Herzog et al. |
| 4,701,602 A | 10/1987 | Schaefer et al. |
| 4,754,940 A | 7/1988 | Deter |
| 4,757,962 A | 7/1988 | Grant |
| 4,765,568 A | 8/1988 | Carl et al. |
| 4,795,111 A | 1/1989 | Moller |
| 4,796,836 A | 1/1989 | Buchelt |
| 4,824,048 A | 4/1989 | Kim |
| 4,828,203 A | 5/1989 | Clifton et al. |
| 4,834,319 A | 5/1989 | Ewy et al. |
| 4,856,732 A | 8/1989 | Eickmann |
| 4,880,071 A | 11/1989 | Tracy |
| 4,892,274 A | 1/1990 | Pohl et al. |
| 4,917,332 A | 4/1990 | Patterson, Jr. |
| 4,934,629 A | 6/1990 | Brant |
| 5,064,143 A | 11/1991 | Bucher |
| 5,101,927 A | 4/1992 | Murtuza |
| 5,209,428 A * | 5/1993 | Bevilaqua et al. ........... 244/12.3 |
| 5,297,761 A | 3/1994 | Kendall, Jr. et al. |
| 5,419,514 A | 5/1995 | Ducan |
| 5,454,531 A | 10/1995 | Melkuti |
| 5,505,407 A | 4/1996 | Chiappetta |
| 5,666,483 A | 9/1997 | McClary |
| 5,738,302 A | 4/1998 | Freeland |
| 5,746,390 A | 5/1998 | Chiappetta et al. |
| 5,806,805 A | 9/1998 | Elbert et al. |
| 5,890,441 A | 4/1999 | Swinson et al. |
| 6,089,501 A | 7/2000 | Frost |
| 6,105,901 A | 8/2000 | Ulanoski et al. |
| 6,119,985 A | 9/2000 | Clapp et al. |
| 6,170,778 B1 | 1/2001 | Cycon et al. |
| 6,254,032 B1 | 7/2001 | Bucher |
| 6,270,038 B1 | 8/2001 | Cycon et al. |
| 6,318,668 B1 | 11/2001 | Ulanoski et al. |
| 6,371,406 B1 | 4/2002 | Corcoran |
| 6,382,559 B1 | 5/2002 | Sutterfield et al. |
| 6,431,494 B1 | 8/2002 | Kinkead et al. |
| 6,446,911 B1 | 9/2002 | Yount et al. |
| 6,457,670 B1 | 10/2002 | Geranio |
| 6,464,166 B1 | 10/2002 | Yoeli |
| 6,474,598 B2 | 11/2002 | Carter, Jr. |
| 6,520,449 B2 | 2/2003 | Illingworth |
| 6,561,456 B1 | 5/2003 | Devine |
| 6,568,630 B2 | 5/2003 | Yoeli |
| 6,616,094 B2 | 9/2003 | Illingworth |
| 6,644,598 B2 | 11/2003 | Glezer et al. |
| 6,704,624 B2 | 3/2004 | Ortega et al. |
| 6,708,920 B2 | 3/2004 | Fukuyama |
| 6,745,977 B1 | 6/2004 | Long et al. |
| 6,751,530 B2 | 6/2004 | Seifert et al. |
| D496,606 S | 9/2004 | Sanders, Jr. |
| 6,808,140 B2 | 10/2004 | Moller |
| 6,817,570 B2 | 11/2004 | Yoeli |
| 6,824,095 B2 | 11/2004 | Mao |
| 6,834,832 B2 | 12/2004 | Jamgarov |
| 6,843,447 B2 | 1/2005 | Morgan |
| 6,883,748 B2 | 4/2005 | Yoeli |
| 6,886,776 B2 | 5/2005 | Wagner et al. |
| 6,892,979 B2 | 5/2005 | Milde |
| 6,892,980 B2 | 5/2005 | Kawai |
| 6,913,226 B2 | 7/2005 | Huynh |
| 6,926,322 B2 | 8/2005 | Browne et al. |
| 6,974,105 B2 | 12/2005 | Pham |
| 7,246,769 B2 | 7/2007 | Yoeli |
| 7,249,732 B2 | 7/2007 | Sanders, Jr. et al. |
| 7,267,300 B2 | 9/2007 | Heath et al. |
| 7,275,712 B2 | 10/2007 | Yoeli |
| 7,717,368 B2 | 5/2010 | Yoeli |
| 7,789,342 B2 | 9/2010 | Yoeli |
| 7,806,362 B2 | 10/2010 | Yoeli |
| 7,857,253 B2 | 12/2010 | Yoeli |
| 7,918,416 B2 | 4/2011 | Yoeli |
| 7,946,528 B2 | 5/2011 | Yoeli |
| 2002/0161488 A1 | 10/2002 | Guillemin et al. |
| 2003/0038213 A1 | 2/2003 | Yoeli |
| 2003/0062442 A1 | 4/2003 | Milde, Jr. |
| 2003/0062443 A1 | 4/2003 | Wagner et al. |
| 2003/0085319 A1 | 5/2003 | Wagner et al. |
| 2003/0127559 A1 | 7/2003 | Walmsley |
| 2003/0195673 A1 | 10/2003 | Foch et al. |
| 2004/0026563 A1 | 2/2004 | Moller |
| 2004/0104303 A1 | 6/2004 | Mao |
| 2004/0149857 A1 | 8/2004 | Yoeli |

| | | |
|---|---|---|
| 2004/0155143 A1 | 8/2004 | Yoeli |
| 2005/0029407 A1 | 2/2005 | Pohl et al. |
| 2005/0040283 A1 | 2/2005 | Frazer |
| 2005/0065669 A1 | 3/2005 | Roux et al. |
| 2005/0178881 A1 | 8/2005 | Yoeli |
| 2005/0242231 A1 | 11/2005 | Yoeli |
| 2006/0113426 A1 | 6/2006 | Yoeli |
| 2006/0231675 A1 | 10/2006 | Bostan |
| 2007/0034734 A1 | 2/2007 | Yoeli |
| 2007/0034739 A1 | 2/2007 | Yoeli |
| 2007/0095971 A1 | 5/2007 | Yoeli |
| 2007/0158494 A1 | 7/2007 | Burrage |
| 2008/0054121 A1 | 3/2008 | Yoeli |
| 2008/0142643 A1 | 6/2008 | Yoeli |
| 2008/0283673 A1 | 11/2008 | Yoeli |
| 2009/0140102 A1 | 6/2009 | Yoeli |
| 2009/0159757 A1 | 6/2009 | Yoeli |
| 2010/0051740 A1 | 3/2010 | Yoeli |
| 2010/0051753 A1 | 3/2010 | Yoeli |
| 2010/0076625 A1 | 3/2010 | Yoeli |
| 2010/0270419 A1 | 10/2010 | Yoeli |
| 2011/0049306 A1 | 3/2011 | Yoeli |
| 2011/0049307 A1 | 3/2011 | Yoeli |

FOREIGN PATENT DOCUMENTS

| | | |
|---|---|---|
| EP | 0 922925 | 6/1999 |
| GB | 935884 | 9/1963 |
| GB | 951186 | 3/1964 |
| IT | 666076 A | 8/1964 |
| SE | 184314 | 6/1963 |
| WO | 01/93039 A1 | 12/2001 |
| WO | 02/096750 A2 | 12/2002 |
| WO | 02/098732 A2 | 12/2002 |
| WO | 03/016134 A1 | 2/2003 |
| WO | 2004/012993 A1 | 2/2004 |
| WO | 2004/031876 A1 | 4/2004 |
| WO | 2005/039972 A2 | 5/2005 |
| WO | 2006/072960 A2 | 7/2006 |
| WO | 2006/131920 | 12/2006 |
| WO | 2007/052271 A2 | 5/2007 |
| WO | 2007/099543 A2 | 9/2007 |
| WO | 2007/129313 A2 | 11/2007 |
| WO | 2008/065654 A2 | 6/2008 |
| WO | 2008/065664 A2 | 6/2008 |
| WO | 2008/135973 A2 | 11/2008 |
| WO | WO 2009/077968 A2 | 6/2009 |
| WO | 2009/147630 A1 | 12/2009 |
| WO | 2010/026517 A2 | 3/2010 |
| WO | 2010/067325 A2 | 6/2010 |

OTHER PUBLICATIONS

Written Opinion and International Search Report of the International Searching Authority in International Application No. PCT/IB08/055301 (now WO 2009/077968) (Yoeli) dated Aug. 14, 2009.
Written Opinion and International Search Report of the International Searching Authority in International Application No. PCT/IB09/052346 (Yoeli) dated Oct. 20, 2009.
U.S. Appl. No. 12/549,872 (Yoeli) filed Aug. 28, 2009.
U.S. Appl. No. 12/598,514 (Yoeli) filed Nov. 2, 2009.
Edward D. Flinn, "Revolutionary X-Hawk Hovers Near Success," Aerospace America, Jul. 2003, pp. 26-28.
Raymond L. Robb, "Driving on Air: 20$^{th}$ Century Flying Carpets," Vertiflite, vol. 51, No. 1, Spring 2005, pp. 2-11.
Urban Aeronautics Ltd., "The X-Hawk VTOL Utility Vehicle"—product description and specifications, 2004.
Piasecki Aircraft Corporation Product Description and History for Piasecki VZ-8 VTOL research vehicle (undated).
De Lorean DMC-12, alleged to have first been produced in 1981 (images available from Wikipedia, the free encyclopedia, at http://en.wikipedia.org/wiki/De_Lorean_DMC-12).
International Search Report for International Application No. PCT/IL02/00417 (now WO02/096750), dated May 23, 2003, published Oct. 2, 2003.
Written Opinion in International Application No. PCT/IL02/00417 (now WO02/096750), Aug. 19, 2003.
International Preliminary Examination Report for International Application No. PCT/IL02/00417 (now WO 02/096750), Oct. 20, 2003.
Corrected International Preliminary Examination Report for International Application No. PCT/IL02/00417 (now WO 02/096750), Jul. 25, 2004.
Written Opinion of the International Searching Authority in International Application No. PCT/IL04/00984 (now WO 2005/039972 (Yoeli)), dated Dec. 6, 2005.
International Preliminary Report on Patentability in International Application No. PCT/IL04/00984 (now WO 2005/039972 (Yoeli)), dated May 1, 2006.
Written Opinion/Search Report of the International Searching Authority in International Application No. PCT/IL06/00032 (now WO 2006/072960 (Yoeli)), dated Sep. 11, 2006.
International Preliminary Report on Patentability in International Application No. PCT/IL06/00032 (now WO 2006/072960 (Yoeli)), dated Sep. 11, 2006.
Written Opinion of the International Searching Authority in International Application No. PCT/IL06/00663 (now WO 2006/131920) (Yoeli) dated Dec. 19, 2006.
International Search Report for International Application No. PCT/IL06/01264 (now WO 2007/052271 A2) (Yoeli) dated Aug. 5, 2008.
Written Opinion of the International Searching Authority in International Application No. PCT/IL06/01264 (now WO 2007/052271 A2) (Yoeli) dated Aug. 5, 2008.
International Search Report for International Application No. PCT/IL07/00544 (now WO 2007/129313) (Yoeli) dated Jul. 7, 2008.
Written Opinion of the International Searching Authority in International Application No. PCT/IL07/00544 (now WO 2007/129313) (Yoeli) dated Jul. 7, 2008.
International Search Report for International Application No. PCT/IL0701465 (now WO 2008/065654) (Yoeli) dated Sep. 30, 2008.
Written Opinion of the International Searching Authority in International Application No. PCT/IL0701465 (now WO 2008/065654) (Yoeli) dated Sep. 30, 2008.
International Search Report for International Application No. PCT/IL08/00575 (now WO 2008/135973) (Yoeli) dated Oct. 28, 2008.
Written Opinion of the International Searching Authority in International Application No. PCT/IL08/00575 (now WO 2008/135973) (Yoeli) dated Oct. 28, 2008.
U.S. Appl. No. 10/523,609 (Yoeli) filed Feb. 7, 2005.
U.S. Appl. No. 10/987,321 (Yoeli) filed Nov. 15, 2004.
U.S. Appl. No. 11/061,652 (Yoeli) filed Feb. 22, 2005.
U.S. Appl. No. 11/411,243 (Yoeli) filed Apr. 26, 2006.
U.S. Appl. No. 11/447,311 (Yoeli) filed Jun. 6, 2006.
U.S. Appl. No. 11/405,003 (Yoeli) filed Apr. 17, 2006.
U.S. Appl. No. 11/794,906 (Yoeli) filed Jul. 9, 2007.
U.S. Appl. No. 11/798,187 (Yoeli) filed May 10, 2007.
U.S. Appl. No. 11/826,202 (Yoeli) filed Jul. 12, 2007.
U.S. Appl. No. 11/892,414 (Yoeli) filed Aug. 22, 2007.
Written Opinion and International Search Report of the International Searching Authority in International Application No. PCT/IB09/053768 (Yoeli) (now WO 2010-026517 A2) dated Mar. 3, 2010.
Written Opinion and Search Report of the International Searching Authority in International Application No. PCT/IL07/00271 (now WO 2007/099543 A2) (Yoeli) dated Oct. 28, 2008.
Written Opinion and Search Report of the International Searching Authority in International Application No. PCT/IL07/01475 (now WO 2008/065664 A2) (Yoeli) dated Sep. 2, 2008.
U.S. Appl. No. 12/226,952 (Yoeli) filed Feb. 27, 2009.
U.S. Appl. No. 12/516,257 (Yoeli) filed May 26, 2009.
U.S. Appl. No. 12/516,743 (Yoeli) filed May 28, 2009.
U.S. Appl. No. 12/747,830 (Yoeli) filed Jun. 11, 2010.
U.S. Appl. No. 13/071,858 (Yoeli) filed Mar. 25, 2011.
Written Opinion and International Search Report of the International Searching Authority in International Application No. PCT/IB09/55656 (now WO 2010-067325 A2) mailed Sep. 30, 2010.
U.S. Appl. No. 12/938,444 (Yoeli) filed Nov. 3, 2010.
U.S. Appl, No, 12/989,533 (Yoeli) filed Oct. 25, 2010.

* cited by examiner

GROUND EFFECT VANES ARRANGEMENT

This application is the U.S. national phase of International Application No. PCT/IL2007/000271 filed 1 Mar. 2007 which designated the U.S. and claims priority to U.S. 60/777,543 filed 1 March 2006, the entire contents of each of which are hereby incorporated by reference.

FIELD AND BACKGROUND OF THE INVENTION

The present invention relates to ducted fan vehicles, and particularly to such vehicles useful as VTOL (Vertical Take-Off and Landing) aircraft. Many different types of VTOL aircraft have been proposed where the weight of the vehicle in hover is carried directly by rotors or propellers, with the axis of rotation perpendicular to the ground. One well known vehicle of this type is the conventional helicopter which includes a large rotor mounted above the vehicle fuselage. Other types of vehicles rely on propellers that are installed inside circular cavities, shrouds, ducts or other types of nacelle, where the propeller or rotor is not exposed, and where the flow of air takes place inside the circular duct. Most ducts have uniform cross-sections with the exit area (usually at the bottom of the duct when the vehicle is hovering) being similar to that of the inlet area (at the top of the duct). Some ducts, however, are slightly divergent, having an exit area that is larger than the inlet area, as this was found to increase efficiency and reduce the power required per unit of lift for a given inlet diameter. Some ducts have a wide inlet lip in order to augment the thrust obtained, especially in hover.

VTOL vehicles are usually more challenging than fixed wing aircraft in terms of stability and control. The main difficulty rises from the fact that, contrary to fixed wing aircraft which accelerate on the ground until enough airspeed is achieved on their flight surfaces, VTOL vehicles hover with sometimes zero forward airspeed. For these vehicles, the control relies on utilizing the rotors or propellers themselves, or the flow of air that they produce to create control forces and moments and forces around the vehicle's center of gravity (CG).

One method, which is very common in helicopters, is to mechanically change, by command from the pilot, the pitch of the rotating rotor blades both collectively and cyclically, and to modify the main thrust as well as moments and/or inclination of the propeller's thrust line that the propeller or rotor exerts on the vehicle. Some VTOL vehicles using ducted or other propellers that are mounted inside the vehicle also employ this method of control. Some designers choose to change only the angle of all the blades using ducted or other propellers that are mounted inside the vehicle for this method of control. The angle of all the blades may be changed simultaneously (termed collective control) to avoid the added complexity of changing the angle of each blade individually (termed cyclic control). On vehicles using multiple fans which are relatively far from the CG, different collective control settings can be used on each fan to produce the desired control moments.

The disadvantage of using collective controls, and especially cyclic controls, lies in their added complexity, weight and cost. Therefore, a simple thrust unit that is also able to generate moments and side forces, while still retaining a simple rotor not needing cyclic blade pitch angle changes, has an advantage over the more complex solution. The main problem is usually the creation of rotational moments of sufficient magnitude required for control.

One traditional way of creating moments on ducted fans is to mount a discrete number of vanes at or slightly below the exit section of the duct. These vanes, which are immersed in the flow exiting the duct, can be deflected to create a side force. Since the vehicle's center of gravity is in most cases at a distance above these vanes, the side force on the vanes also creates a moment around the vehicle's CG.

However, one problem associated with vanes mounted at the exit of the duct in the usual arrangement as described above, is that even if these are able to create some moment in the desired direction, they cannot do so without creating at the same time a significant side force that has an unwanted secondary effect on the vehicle. For such vanes mounted below the vehicle's CG (which is the predominant case in practical VTOL vehicles), these side forces cause the vehicle to accelerate in directions which are usually counter-productive to the result desired through the generation of the moments by the same vanes, thereby limiting their usefulness on such vehicles.

The Chrysler VZ-6 VTOL flying car uses vanes on the exit side of the duct, together with a small number of very large wings mounted outside and above the duct inlet area.

However, in the VZ-6, the single wing and the discrete vanes were used solely for the purpose of creating a steady, constant forward propulsive force, and not for creating varying control moments as part of the stability and control system of the vehicle. The Hornet unmanned vehicle developed by AD&D, also experimented with using either a single, movable large wing mounted outside and above the inlet, or, alternatively using a small number of vanes close to the inlet side. However these were fixed in angle and could not be moved in flight.

Another case that is sometimes seen is that of vanes installed radially from the center of the duct outwards, for the purpose of creating yawing moments (around the propeller's axis).

The vehicle described by Bucher (U.S. Pat. No. 5,064,143) has tangential blades only at the exit end of the duct.

The vehicle described by Crane (U.S. Pat. No. 2,880,945) has annular openings with plurality of vanes which are either open to allow airflow in vertical flight or closed to facilitate deliberate blockage of the flow in horizontal flight.

SUMMARY OF THE INVENTION

In one aspect of the present invention a vehicle is provided with a ducted fan propulsion system which also produces rotary moments and side forces for control purposes, as well as means to influence air outflow from the duct improving the flight and hover performance of the ducted fan close and far from the ground. Another aspect of the invention is to provide a vehicle of the foregoing type particularly useful for VTOL aircraft.

According to an exemplary embodiment, there is provided a vehicle, comprising: a vehicle frame; a duct carried by the vehicle frame with the longitudinal axis of the duct perpendicular to the longitudinal axis of the vehicle frame; a propeller rotatably mounted within the duct about the longitudinal axis of the duct to force an ambient fluid therethrough from its inlet at the upper end of the duct through its exit at the lower end of the duct, and thereby to produce an upward lift force applied to the vehicle; and a plurality of spaced vanes mounted to and across the inlet end of the duct about pivotal axes perpendicular to the longitudinal axis of the duct and selectively operational to produce a desired horizontal control force in addition to the lift force applied to the vehicle.

It has been found that such a vehicle equipped with a plurality of such vanes mounted across the inlet of the duct (as distinguished from the exit end of the duct) can indeed produce a combination of side forces with rotational moment that is favorable to the normal control of the vehicle. It has also been found that such vanes across the inlet end of the duct, particularly when combined with a second plurality of vanes across the outlet end of the duct, can produce desired forward, aft, left and right translation movements, as well as yaw, pitch and roll rotary movement of the vehicle. It has also been found that the vanes across the outlet end of the duct, if selectively rotatable to align substantially with the transverse outflow stream lines, can prevent separation of the flow on said vanes and retain the control effectiveness of the vanes near ground.

In some described embodiments, the vanes are substantially parallel to the longitudinal axis of the vehicle frame. In other described embodiments, the vanes are arranged in "pie slice" segments of the duct, where the vanes in each slice span the slice from edge to edge, preferably being substantially perpendicular to the bisecting radius of the segment. In this arrangement, when the vanes at the exit of the duct are deflected outwards from the center of the duct, they affect spreading out and diffusion of the flow as it exits the duct, increasing the pressure acting on the bottom of the duct and thereby enhancing the lift performance of the rotors.

Another embodiment is described wherein the vanes include a first group of parallel vanes extending across one half of the inlet of the duct and pivotal about axes at a predetermined acute angle with respect to the longitudinal axis of the vehicle frame; and a second group of parallel vanes extending across the remaining half of the inlet end of the duct and pivotal about axes at the predetermined angle, but in the opposite direction, with respect to the longitudinal axis of the vehicle frame; the first and second groups of vanes being selectively operational to produce a desired net control force in addition to the lift force applied to the vehicle.

According to further features in the described embodiments, the vanes have a symmetrical airfoil shape, or alternatively a slightly non-symmetrical airfoil shape, and are spaced from each other a distance substantially in the range of between 50% and 100% of the chord length of the vanes.

In one described embodiment, each of the vanes is pivotally mounted as a unit for its complete length to produce a desired side force component. In a second described embodiment, each of the vanes is split into two halves, each half of all the vanes being separately pivotal from the other half of all the vanes, whereby the component force to the lift force applied to the vehicle is a rotary moment force about the duct longitudinal axis.

Other embodiments are described wherein, in one case, each of the vanes is pivotally mounted about an axis passing through the vane, and in another case, each of the vanes includes a fixed section and a pivotal section pivotally mounted at the trailing side of the fixed section.

According to further features in some described embodiments, the duct includes a second plurality of parallel, spaced vanes pivotally mounted to and across the inlet end of the duct about pivotal axes perpendicular to the pivotal axes of the first-mentioned plurality of vanes and perpendicular to the longitudinal axis of the duct.

In one described embodiment, the pivotal axes of the second plurality of vanes are in a plane vertically spaced from the pivotal axes of the first-mentioned plurality of vanes; Whereas in a second described embodiment, the pivotal axes of the second plurality of vanes are in a common plane with that of the pivotal axes of the first-mentioned plurality of vanes. With respect to the latter embodiment, it may be desirable to have a slight shift in the two planes in order to offset the pivotal mounting of the vanes, but in such case, the shift would be relatively small, e.g., less than one chord length.

Another embodiment is described wherein the duct includes a second plurality of spaced vanes pivotally mounted to and across the exit end of the duct about pivotal axes perpendicular to the longitudinal axis of the duct and selectively pivotal about their axes to produce another desired side control force or rotary moment control force, in addition to the lift force applied to the vehicle, or other vanes configurations at the exit end of the duct similar to those described for the inlet side.

Another embodiment is described wherein the duct includes vanes that are not pivotally mounted, but employ other aerodynamic means such as air suction or blowing through orifices on the surface of the vanes or piezoelectric actuators or other fluidic control means to induce steady or periodic pressure field changes to the flow around the vanes, all with the purpose of producing desired side control force or rotary moment control force, in addition to the lift force applied to the vehicle.

Since the foregoing features of the invention are especially useful with respect to VTOL aircraft vehicles, the invention is described below particularly with respect to such vehicles, but it will be appreciated that the invention, or various features thereof, could also be advantageously used in other vehicles, such as sea vehicles.

Further features and advantages of the invention will be apparent from the description below.

While the invention has been described above particularly with respect to pivotally mounted vanes it will be appreciated that the invention or various aspects of the invention as described can also be advantageously used when described with non pivotal vanes.

Such non pivotal vanes may employ aerodynamic means other than rotation to modify the pressure field around the vanes for creating a side force, such as air suction or blowing through orifices on the surface of the vanes or piezoelectric actuators or other fluidic control means to induce steady or periodic pressure field changes to the flow around the vanes, all with the purpose of producing desired side control force or rotary moment control force, in addition to the lift force applied to the vehicle.

Therefore, according to another aspect of the present invention, there is provided a vehicle, comprising: a vehicle flame; a duct carried by the vehicle frame with the longitudinal axis of the duct perpendicular to the longitudinal axis of the vehicle frame; a propeller rotatably mounted within the duct about the longitudinal axis of the duct to force an ambient fluid through from its inlet at the upper end of the duct through its exit at the lower end of the duct, and thereby to produce an upward lift force applied to the vehicle; and a plurality of parallel spaced vanes of either airfoil cross section or elliptical cross section, or any other shape as required to facilitate vane operation, that are non-pivotally mounted to and across the inlet end of the duct about and substantially parallel to said longitudinal axis of the vehicle frame, said vanes being operative to have means of affecting said ambient fluid through either air suction or blowing through orifices on the surface of the vanes or piezoelectric actuators or other fluidic control means to induce steady or periodic pressure field changes to the flow around the vanes, all with the purpose of producing desired side control force or rotary moment control force, in addition to the lift force applied to the vehicle.

Such a vehicle equipped with a plurality of such non-pivotal vanes mounted across the inlet of the duct (as distinguished from the exit end of the duct) can indeed produce a combination of side forces with rotational moment that is favorable to the normal control of the vehicle. It has also been found that side-force producing vanes across the inlet end of the duct, particularly when combined with a second plurality of vanes across the outlet end of the duct, can produce desired forward, aft, left and right translation movements, as well as yaw, pitch and roll rotary movement of the vehicle.

All the various different embodiments of the invention described herein with pivotal or partially pivotal vanes can be advantageously used when the pivotal vanes are replaced by non-pivotal ones with operation as described above.

While the invention has been described above particularly with respect to either pivotally or non-pivotally mounted vanes it will be appreciated that the invention or various aspects of the invention as described can also be advantageously used when described with combination of such pivotal and non pivotal vanes whereas each type of vanes is used according to its advantage such as control power output endurance or contingency in case of failure.

According to further features in some described embodiments the vanes are twisted along their longitudinal axis to better adjust their plane of symmetry to the local variations in the incoming flow into the duct.

According to further features in some described embodiments, the vanes, in addition to their rotation for control purposes, are rotated to align themselves with the local flow angularity to avoid separation of the flow on the vanes.

According to further features in some described embodiments, the vanes, in addition to their rotation for control purposes, are rotated to also to concentrically affect the contraction or expansion of the wake of the flow downstream of the duct. According to further features in some described embodiments, fluidic control means such as air suction or blowing through orifices or piezoelectric actuators or other fluidic control means to induce steady or periodic pressure field changes to the flow around the vanes, are added to or incorporated into the inner surface of the duct, in the vicinity of the vanes all with the purpose of affecting the flow field in the vicinity of the duct wall and adjacent vanes, to straighten or improve the flow around the vanes, or for avoiding separation of the flow from the duct wall and between the vanes and said duct wall.

According to another aspect of the invention, there is provided a method of improving aerodynamic flow through a ducted fan of a VTOL vehicle when the VTOL vehicle is in proximity to the ground, the ducted fan comprising an open-ended duct, having an inlet end and an outlet end; a propeller mounted within the duct between the inlet and outlet ends; and a first plurality of vanes extending across the inlet end of the duct; the method comprising: (a) adding a second plurality of vanes across the outlet end of the duct, the second plurality of vanes being pivotally adjustable about axes parallel to longitudinal axes of the second plurality of vanes; and (b) pivotally adjusting at least some of the second plurality of vanes to substantially match angularity of flow exiting the duct caused by the flow impinging on the ground.

In another aspect, there is provided a method of improving aerodynamic flow through a ducted fan of a VTOL vehicle when the VTOL vehicle is in proximity to the ground, the ducted fan comprising an open-ended duct, having an inlet end and an outlet end; a propeller mounted within the duct between the inlet and outlet ends and a first plurality of vanes extending across the inlet end of the duct; the method comprising:

(a) adding a second plurality of vanes across the outlet end of the duct; and (b) providing means for adjusting flow along said second plurality of vanes to substantially match angularity of flow exiting the duct caused by the flow impinging on the ground.

BRIEF DESCRIPTION OF THE DRAWINGS

The invention is herein described, by way of example only, with reference to the accompanying drawings, wherein.

DETAILED DESCRIPTION OF THE INVENTION

Figures 1, 2, 3:
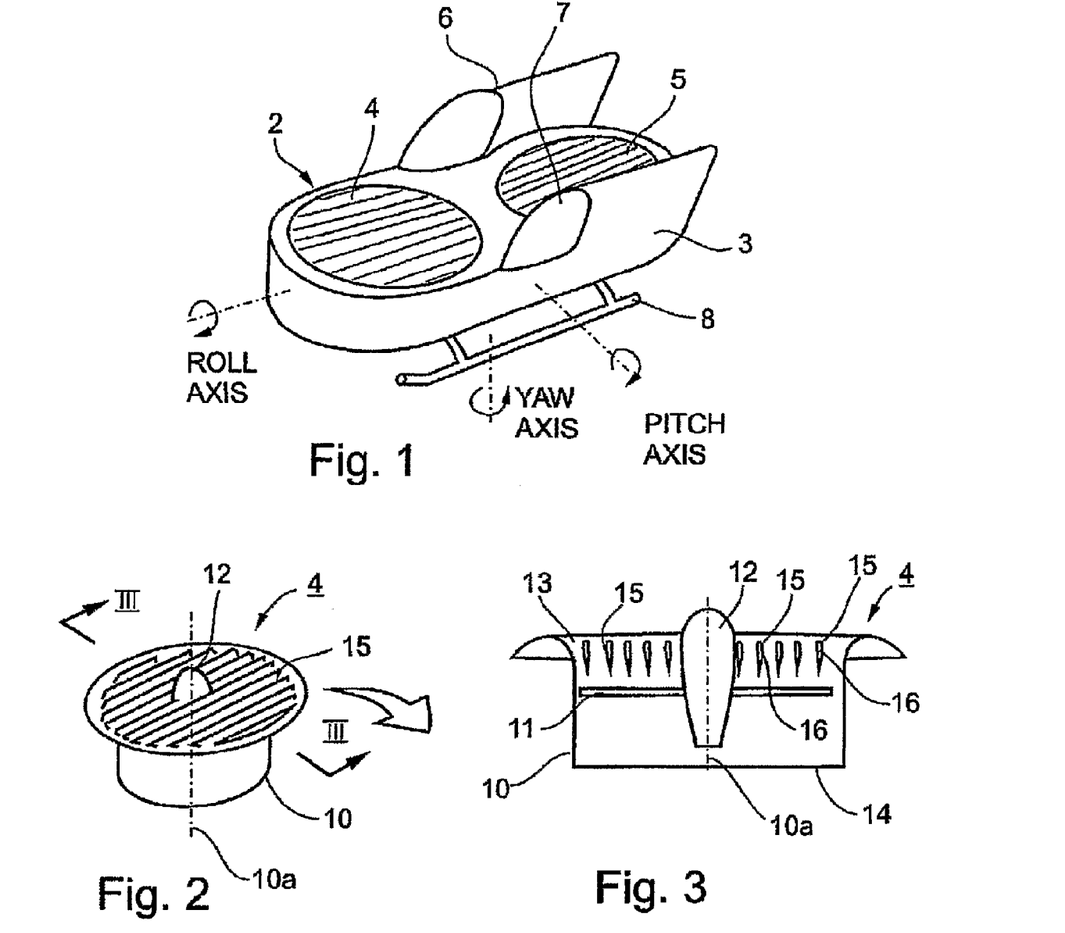
FIG. 1 illustrates one form of VTOL aircraft vehicle constructed in accordance with present invention.
FIG. 2 illustrates only one of the ducted fans in the aircraft of FIG. 1.
FIG. 3 is a sectional view along line III-III of FIG. 2.

The vehicle illustrated in FIG. 1, and therein generally designated 2, is a VTOL aircraft including a frame or fuselage 3 carrying a ducted fan propulsion unit 4 at the front, and another similar propulsion unit 5 at the rear. The vehicle payload is shown at 6 and 7, respectively, on opposite sides of the fuselage, and the landing gear as shown at 8.

FIGS. 2 and 3 more particularly illustrate the structure of propulsion unit 4, which is the same as propulsion unit 5. Such a propulsion unit includes a duct 10 carried by the fuselage 3 with the vertical axis 10a of the duct parallel to the vertical axis of the vehicle. Propeller 11 is rotatably mounted within the duct 10 about the longitudinal axis 10a of the duct. Nose 12 of the propeller faces upwardly, so that the upper end 13 of the duct constitutes the air inlet end, and the lower end 14 of the duct constitutes the exit end. As shown particularly in FIG. 3, the upper air inlet end 13 is formed with a funnel-shaped mouth to produce a smooth inflow of air into the duct 10, which air is discharged at high velocity through the exit end 14 of the duct for creating an upward lift force.

Figure 4:
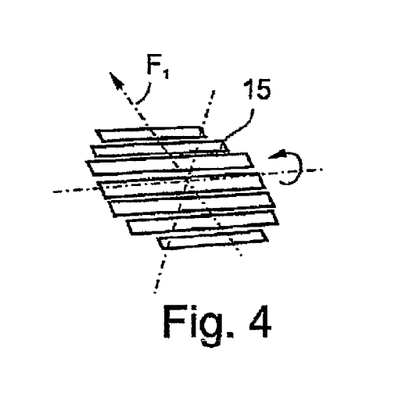
FIG. 4 is a diagram illustrating the positioning of the vanes of FIG. 3 in one direction to produce a lateral force in one direction.
Figure 5:
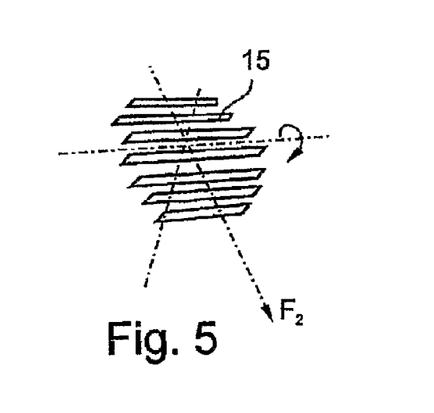
FIG. 5 is a diagram illustrating the positioning of the vanes of FIG. 3 to produce a lateral force in the opposite direction.

To provide directional control, the duct 10 is provided with a plurality of parallel, spaced vanes 15 pivotally mounted to, and across, the inlet end 13 of the duct. Each of the vanes 15 is pivotal about an axis 16 perpendicular to the longitudinal axis 10a of the duct 10 and substantially parallel to the longitudinal axis of the vehicle frame 2, to produce a desired horizontal control force in addition to the lift force applied to the vehicle by the movement of air produced by the propeller 11. Thus, as shown in FIG. 4, if the vanes 15 are pivoted in one direction about their respective axes, they produce a desired control force in the direction of the arrow F1 in FIG. 4; and if they are pivoted in the opposite direction, they produce a desired control force in the direction of the arrow F2 in FIG. 5. As shown in FIG. 3 (also FIGS. 7, 8, 12), the vanes 15 are of a symmetric airfoil shape and are spaced from each other a distance approximately equal to the chord length of the vanes.

Figure 6:
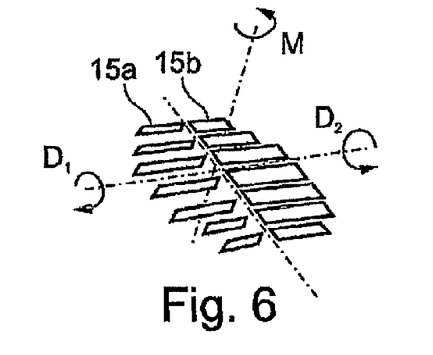
FIG. 6 illustrates a modification in the construction of the vanes wherein each of the vanes is split into two halves, each half of all the vanes being separately pivotal from the other half of all the vanes to produce a rotary moment force about the duct longitudinal axis.

FIG. 6 illustrates a variation wherein each of the vanes 15, instead of being pivotally mounted as a unit for its complete length to produce the desired side control force is split into two half-sections, as shown at 15a and 15b in FIG. 6, with each half-section separately pivotal from the other half-section. Thus, all the half-sections 15a may be pivoted as a unit in one direction as shown by arrow D1, and all the half-sections 15b maybe pivoted in the opposite direction as shown by arrow D2, to thereby produce any desired side force or rotary moment in addition to the lift force applied to the vehicle by the propeller.

Figure 7:
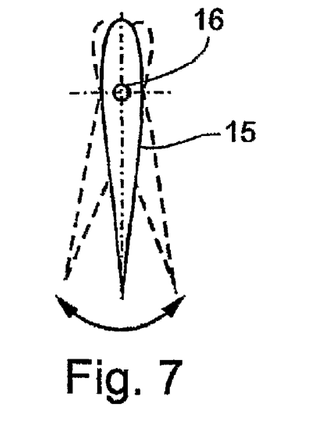
FIG. 7 is a diagram illustrating the construction of one of the vanes and the manner for pivoting it.
Figure 8:
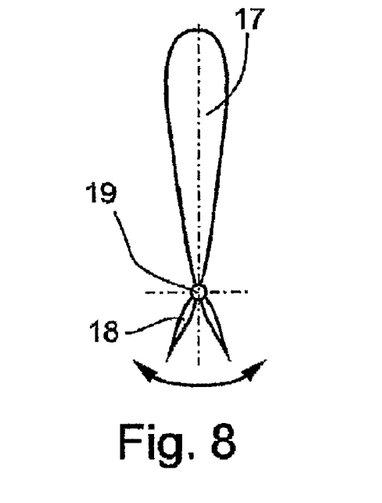
FIG. 8 illustrates an alternative construction of one of the vanes and the manner for pivoting it.

As shown in FIG. 7, each of the vanes 15 is pivotally mounted about axis 16 passing through a mid portion of the vane. FIG. 8 illustrates a modification wherein each vane includes a fixed section 17, which constitutes the main part of the vane, and a pivotal section or flap 18 pivotally mounted at 19 to the trailing side of the fixed section. It will thus be seen that the pivotal section or flap 18 may be pivoted to any desired position in order to produce the desired control force in addition to the lift.

Figure 9:
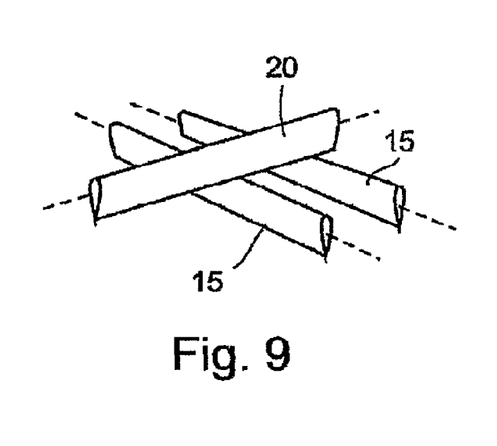
FIG. 9 illustrates one arrangement that may be used for providing two cascades or assemblies of vanes at the inlet end of the duct of FIG. 9.

FIG. 9 illustrates a variation wherein the ducted fan (4 and/or 5, FIG. 1) includes a second plurality or cascade of parallel, spaced vanes, one of which is shown at 20, pivotally mounted to and across the inlet end 13 of the duct 10. Thus, each of the vanes 20 of the second plurality is closely spaced to the vanes 15 and is pivotal about an axis perpendicular to the pivotal axis of the vanes 15, as well as to the longitudinal axis 10a of the duct.

Figure 10:
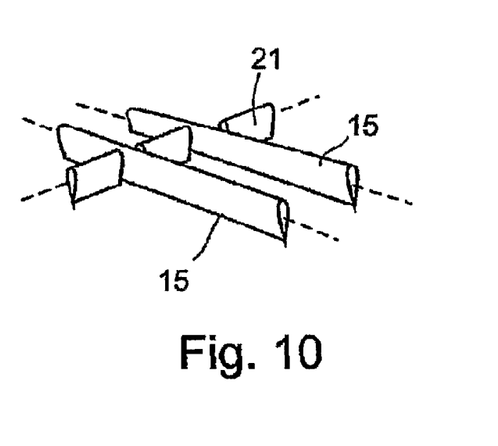
FIG. 10 illustrates another arrangement that may be used for providing two cascades or assemblies of vanes at the inlet end of the duct.

In the variation illustrated in FIG. 9, the two cascades of vanes 15, 20, are arranged in parallel, spaced planes. FIG. 10 illustrates a variation wherein the two cascades of vanes at the inlet end of the duct are intermeshed. For this purpose, each of the vanes 21 of the second plurality would be interrupted so as to accommodate the crossing vanes 15 of the first plurality, as shown in FIG. 10. Another possible arrangement would be to have the vanes of both cascades interrupted for purposes of intermeshing.

Figure 11:
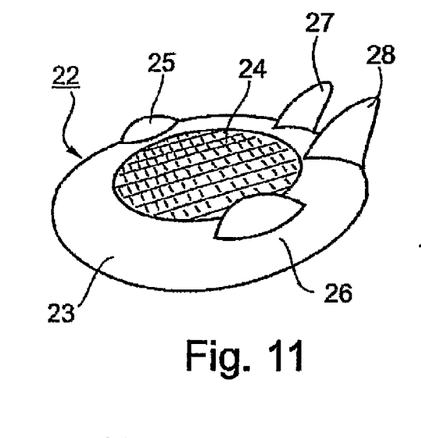
FIG. 11 illustrates a VTOL aircraft vehicle including a single ducted fan for propulsion and control purposes.

FIG. 11 illustrates a VTOL aircraft vehicle, therein generally designated 22, including a single ducted fan 24 carried centrally of its fuselage 23. Such a vehicle could include the arrangement of vanes illustrated in either FIG. 9 or in FIG. 10 to provide the desired control forces and moments in addition to the lift forces. In such a vehicle, the payload may be on opposite sides of the central ducted fan 24, as shown at 25 and 26 in FIG. 11. The vehicle may also include other aerodynamic surfaces, such as rudders 27, 28 to provide steering and other controls.

Figure 12:
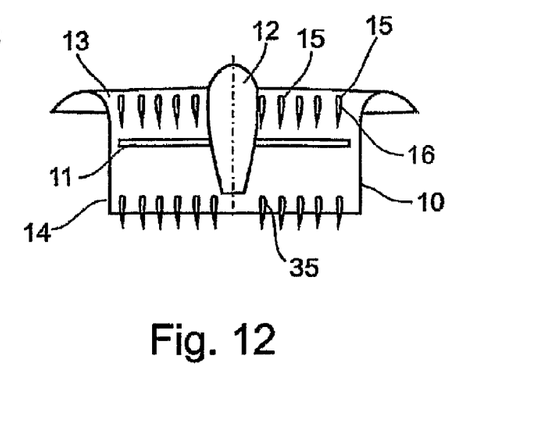
FIG. 12 is a view similar to that of FIG. 3 but illustrating the provision of a cascade or plurality of vanes also at the exit end of the duct.

FIG. 12 illustrates a further embodiment that may be included in either of the vehicles of FIGS. 1 and 11 wherein the duct 10 also has a second plurality or cascade of parallel, spaced vanes, but in this case, the second plurality are pivotally mounted to and across the exit end 14 of the duct 10. Thus, as shown in FIG. 12, the duct 10 includes the first plurality or cascade of blades 15 mounted to and across the inlet end 13 of the duct, and a second plurality or cascade of blades 35 mounted to and across the exit end 14 of the duct 10, also perpendicular to the longitudinal axis of the duct and substantially parallel to the longitudinal axis of the vehicle frame. Each assembly or cascade 15, 35 of the vanes may be pivoted independently of the other to produce selected side forces or rotary moments about the duct's transverse axis 10b for pitch or roll control of the vehicle.

Figure 13A:
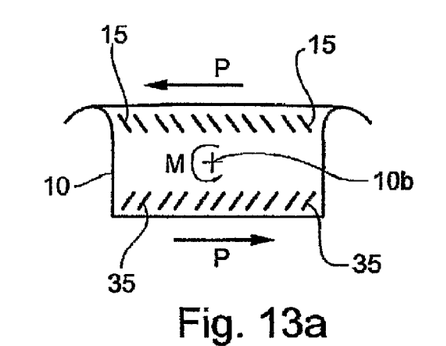
FIGS. 13a-13d illustrate various pivotal positions of the two cascades of vanes in the ducted fan of FIG. 12, and the forces produced by each such positioning of the vanes.
Figure 13B:
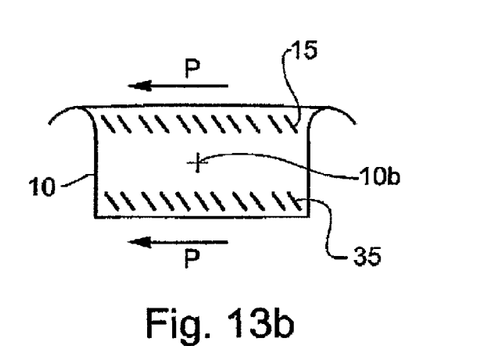
Figure 13C:
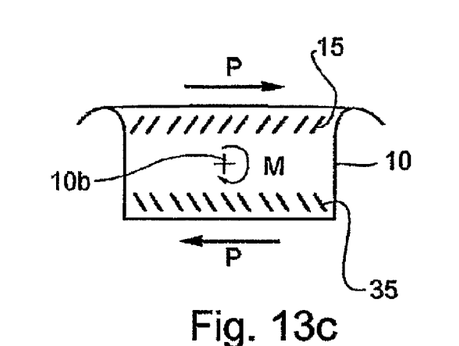
Figure 13D:
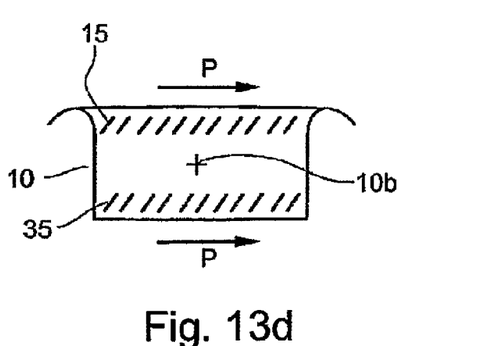

This is more clearly shown in the diagrams of FIGS. 13a-13d. Thus, when the two cascades of vanes 15, 35, are pivoted in opposite directions, they produce a rotary moment about the transverse axis 10b of the duct 10 in one direction (e.g., counter-clockwise as shown in FIG. 13a); when they are pivoted in the same direction, they produce a side force in one direction (e.g. left) as shown in FIG. 13b when pivoted in opposite directions but opposite to the arrangement shown in FIG. 13a, they produce a rotary moment in the opposite clockwise direction as shown in FIG. 13c; and when they are pivoted in the same direction but opposite to that shown in FIG. 13b, they produce a side force in the opposite (e.g. right) direction, as shown in FIG. 13d.

Figure 14:
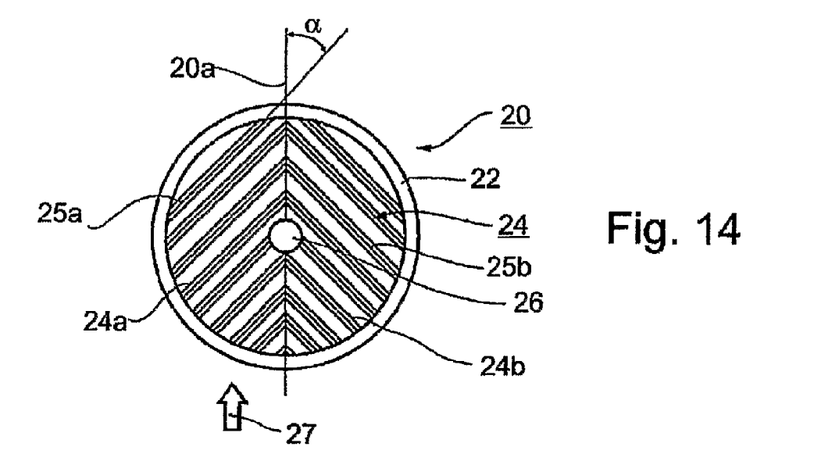
FIG. 14 is a top view diagrammatically illustrating another construction wherein the vanes extending across the inlet of the duct are divided into two groups together producing the desired net horizontal control force.

FIG. 14 is a top view illustrating another construction of ducted fan propulsion unit, generally designated 20, including a duct 22 having a plurality of vanes 24 extending across the inlet end of the duct. In this case, the vanes 24 are divided into a first group of parallel vanes 24a extending across one-half the inlet end of the duct 22, and a second group of parallel vanes 24b extending across the remaining half of the inlet end of the duct.

FIG. 14 also illustrates the nose 26 of the propeller within the duct 22. The propeller is rotatably mounted within the duct 22 about the longitudinal axis of the duct, with the nose 26 of the propeller centrally located at the air inlet end of the duct such that the air discharged at a high velocity through the opposite end of the duct creates an upward lift force.

As shown in FIG. 14, the first group of parallel vanes 24a extending across one half of the inlet end of the duct 22 are pivotal about axes 25a at a predetermined acute angle α with respect to the longitudinal axis 20a of the vehicle frame and thereby of the direction of movement of the vehicle as shown by arrow 27; and that the second group of parallel vanes extending across the remaining half of the inlet end of the duct are pivotal about axes 25b at the same predetermined angle α, but in the opposite direction, with respect to the longitudinal axis 20a of the vehicle frame. The two groups of vanes 24a, 24b are selectively pivotal to produce a desired net horizontal control force in addition to the lift force applied to the vehicle.

Figure 15A:
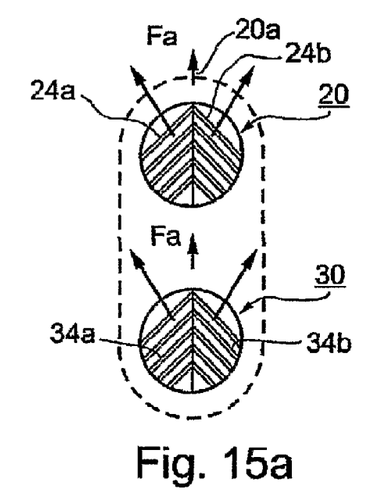
FIGS. 15a and 15b diagrammatically illustrate the manner in which the desired net horizontal control force is produced by the vanes of FIG. 14.
Figure 15B:
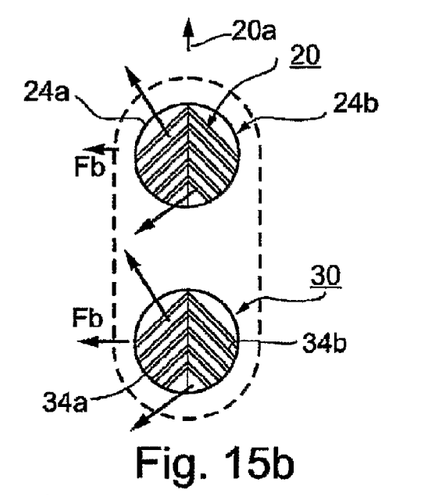

The foregoing operations are illustrated in the diagrams of FIGS. 15a and 15b. Both FIG. 15a and 15b illustrate the control forces generated when the vehicle includes two ducted fan propulsion units 20, 30, at the opposite ends of the vehicle and coaxial with the vehicle longitudinal axis 20a. It will be appreciated that comparable forces are produced when the vehicle is equipped with only one ducted fan propulsion unit shown in FIG. 14.

FIG. 15a illustrates the condition wherein the two groups of vanes 24a, 24b are pivoted to equal angles about their respective axes 25a, 25b. The vanes thus produce, in addition to the lift force, control forces of equal magnitude and angles on opposite sides of the vehicle longitudinal axis 20a, so as to produce a net force, shown at Fa, coaxial with the vehicle longitudinal axis 20a.

The two groups of vanes 34a, 34b of the rear propulsion unit 30 are pivotal in the same manner about their respective pivotal axes 35a, 35b, and thereby produce a net force Fa also coaxial with the vehicle longitudinal axis 20a.

FIG. 15b illustrates a condition wherein the two groups of vanes 24a, 24b in the fore propulsion unit 20, and the two groups of vanes 34a, 34b in the aft propulsion unit 30, are pivoted about their respective axes to unequal angles, thereby producing net side forces Fb at an angle to the vehicle longitudinal axis 20a. Thus, by controlling the pivot angles of the vanes 24a, 24b and 34a, 34b about their respective pivotal axes, a net control force may be generated as desired in the plane of the vanes.

Figure 16:
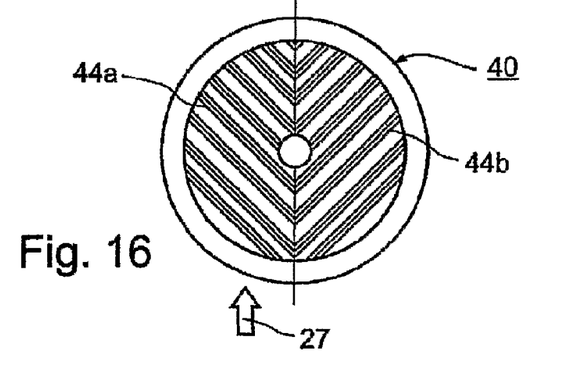
FIG. 16 is a view corresponding to that of FIG. 14 but illustrating a variation in the vane arrangement for producing the desired net horizontal control force.

FIG. 16 illustrates a ducted fan propulsion unit, generally designated 40, also including two groups of vanes 44a, 44b, extending across one-half of the inlet of the duct 42 and pivotally mounted about axes 45a, 45b at a predetermined angle, (e.g., 45°) to the longitudinal axis 40a of the vehicle. In this case, however, the vanes 44a, 44b are oriented in the forward direction, rather than in the aft direction as in FIG. 14, but the operation, and the forces generated by the vanes, are basically the same as described above with respect to FIGS. 14, 15a, 15b.

Figure 17:
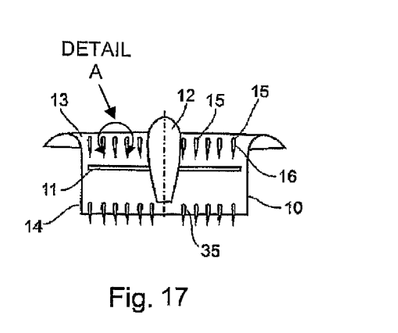
FIG. 17 is a view similar to that of FIG. 12 but illustrating the provision of a cascade or plurality of non-pivotal vanes at the inlet and exit of the duct.
Figure 18A:
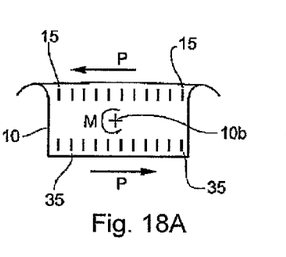
FIG. 18a-d illustrate forces produced by various operation of the two cascades of non-pivotal vanes in the ducted fan of FIG. 17 which are similar to the forces produced by the pivotally mounted vanes as shown in FIGS. 13a-13d.
Figure 18B:
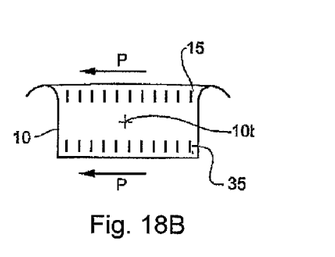
Figure 18C:
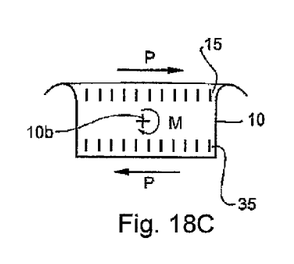
Figure 18D:
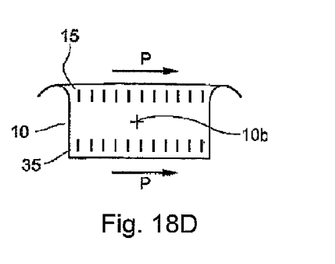

FIG. 17-FIG. 18 illustrate that forces produced by non-pivotal vanes are basically the same as those produced by pivotally mounted vanes as shown in FIGS. 12 and 13.

Figure 19:
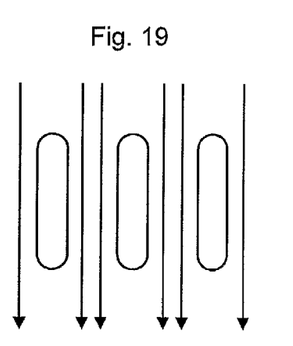
FIG. 19 is an enlarged detail A of FIG. 17 which illustrates a schematic uninterrupted fluid flow when vanes are non operative.
Figure 20:
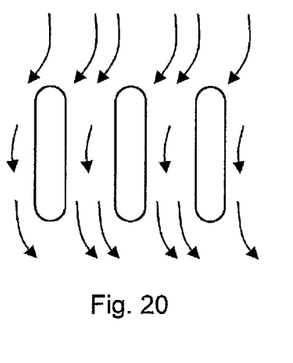
FIG. 20 is an enlarged detail A of FIG. 17 which illustrates a schematic fluid flow when vanes are operative to produce forces as shown in the upper vanes of FIG. 18 *a* and *b*.

FIGS. 19-20 illustrates the schematic flow profile when the vanes are operational and non operational.

Figure 21:
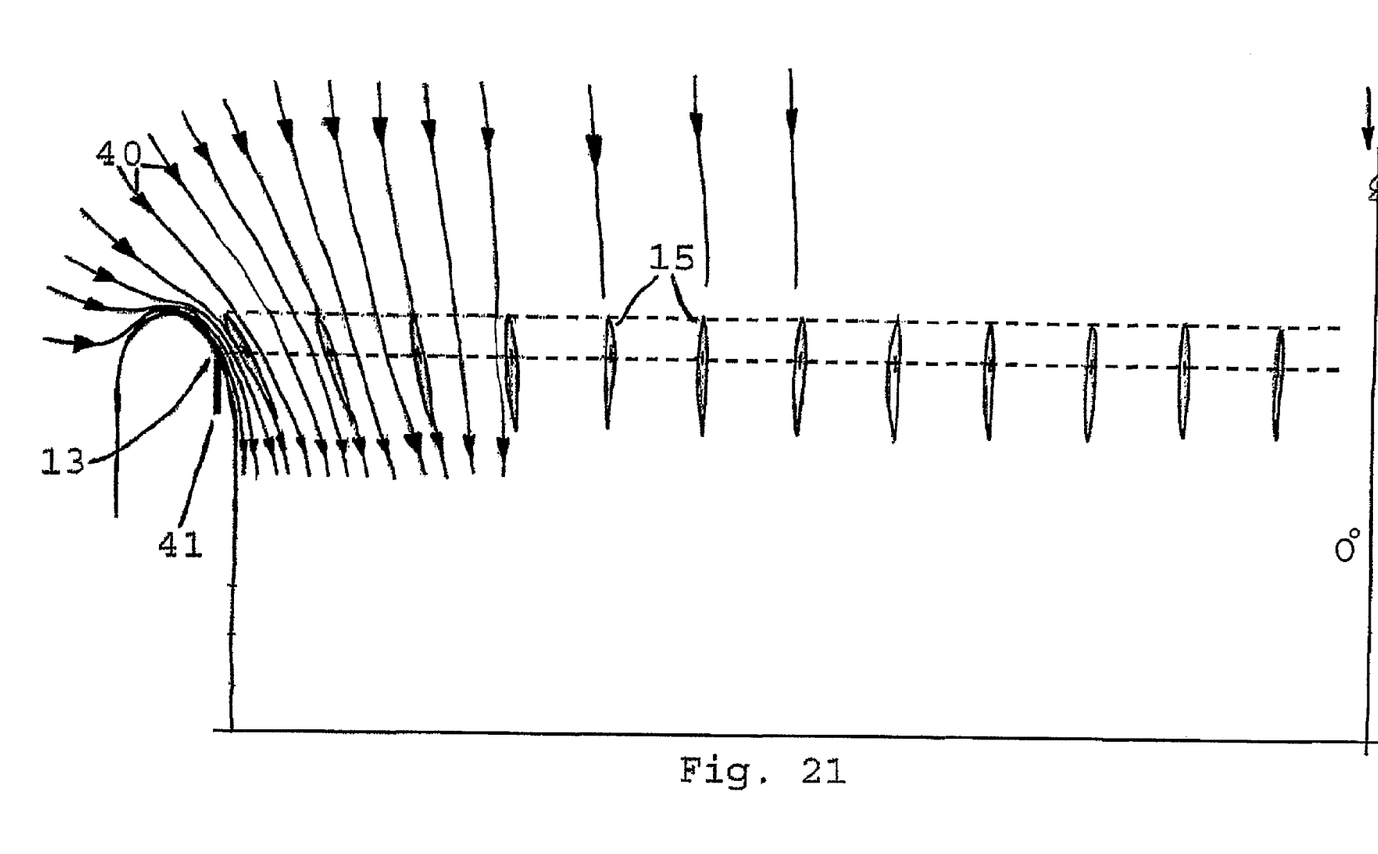
FIG. 21 illustrates schematic fluid flow in a cross section of vanes twisted along their longitudinal axis to adjust their plane of symmetry to the local variations in the incoming flow into the duct.

FIG. 21 illustrates the schematic cross section of the duct with twisted vanes. Vanes 15 are untwisted near the center of the duct and twisted near the surface of edge 13 of the duct where the affected flow field 40 is schematically shown. A schematic fluidic control means 41 incorporated into the inner surface of the duct is affecting the flow field in the vicinity of the duct wall.

Figures 22A, 22B:
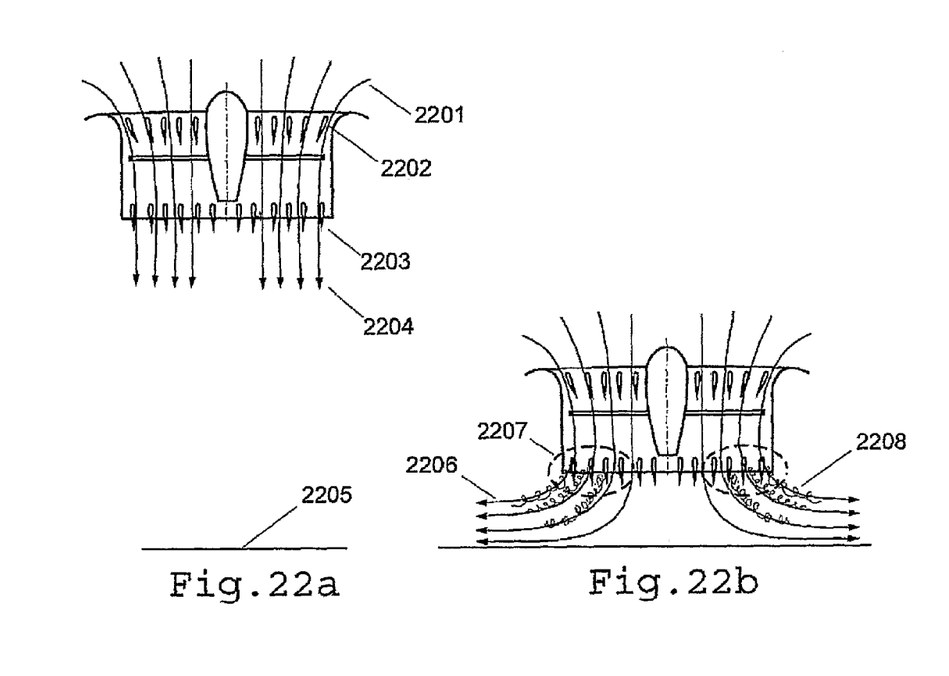
FIGS. 22a-22c illustrate the schematic flows in cross sections of ducts which are far from the ground or in its vicinity.
Figure 22C:
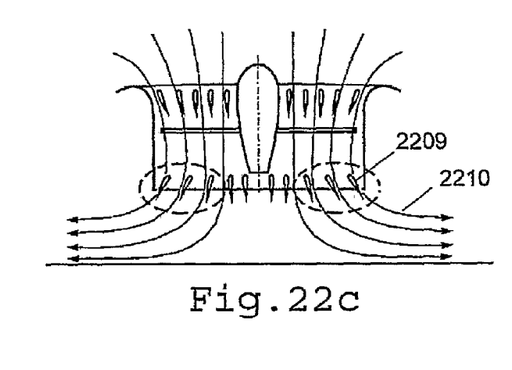

FIG. 22 illustrates a condition where distortion of the exit flow from a ducted fan propulsion unit can occur in the vicinity of the ground Shown schematically in the cross section at FIG. 22a is the normal flow through the duct when the ducted fan propulsion unit is far from the ground shown schematically as 2205. The air 2201 enters the duct through the intake where vanes such as 2202 are oriented in line with the incoming streamlines. The air exits at the bottom with streamlines 2204 generally pointing straight down. Therefore, vanes such as 2203 are also oriented vertically, parallel with the flow. Shown at FIG. 22b is the flow through the same ducted fan propulsion unit at vicinity to the ground. While streamlines entering the duct remain generally in the same form as in the previous case, the flow at the exit changes materially, as streamlines shown schematically at 2206 assume an outwardly manner for the air to continue flowing in the presence of the ground. Also shown in FIG. 22b is a region of the flow 2207 where the change in angularity of the flow is such that vanes immersed in the flow in that region may be subject to stall, loss of aerodynamic effectiveness and high drag, all of which are shown schematically as detached vortices at 2208. The schematic illustration FIG. 22c shows that if the vanes that have been subject to flow separation due to change in streamline direction are rotated to align themselves to 'zero' position with the local flow angularity such as shown at 2209, then the flow exiting the duct and shown schematically at 2010 will remain attached to said vanes and the vanes will remain fully effective as aerodynamic controls with no additional drag similar to their operation when the ducted fan propulsion unit is far from the ground as shown in section FIG. 22a. It should be mentioned that best results of these vanes are expected when each vane is installed with a separate actuation means so that it can be positioned and rotated individually to a different angle for aligning itself with the local flow. However, even if these vanes are selected to be formed into groups and rotated together, mostly to save the trouble of rotating each vane separately, then still, a local average streamline can be used as a guideline for the central vane in the group. Other vanes in that group may still see some angularity, but not large enough to cause flow separation and loss of effectiveness. It should also be noted that the reason for such rotation of the vanes to the local streamlines is only for establishing each vane's "zero" position, from which each vane can be further rotated to each side typically up to stall, about 10-12 degrees, in order to perform its function as a control vane in the ducted fan propulsion unit as described above herein. It should further be noted that the angle by which each vane or group of vanes should be rotated to keep them substantially aligned with the flow can be determined either through measurements in real time by sensors mounted in the duct or be pre-set, based on analysis or parametric testing of the ducted fan propulsion unit or similar ducted fan propulsion units for various combinations of distance from ground and duct flow conditions. It should be appreciated that the application illustrated in FIG. 22 is valid either when the vanes move individually, move in clusters, some fixed while others move, or a combination thereof, or also when non-pivotal vanes are used, to preserve smooth and undetached flow on each such non-pivotal vane as long as fluidic control means such as air suction or blowing through orifices on the surface of the vanes or piezoelectric actuators to avoid or reduce separation of the flow on each non-pivotal vane are employed as required by the local streamline direction near each vane. It should be further appreciated that such fluidic control means to avoid or reduce separation of the flow can be applied on or in combination with pivotal vanes as well.

Figure 23A:
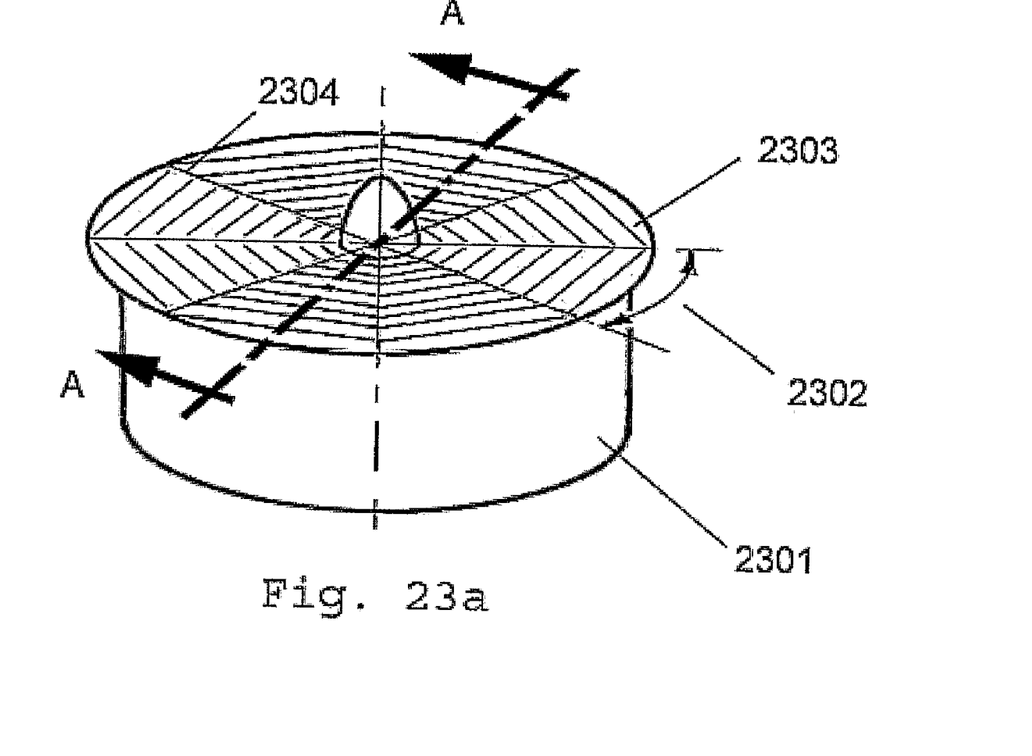
FIGS. 23a and 23b illustrate the pluralities of vanes arranged in "pie slice" segments of the duct, where the vanes in each slice span the slice from edge to edge.
Figure 23B:
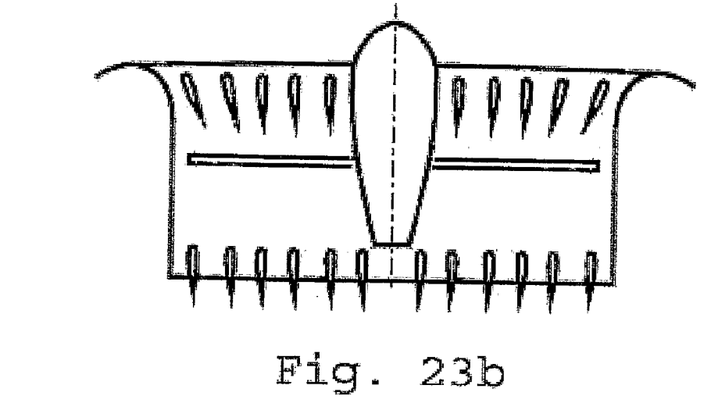

FIG. 23a illustrates an arrangement of control vanes that is an alternative to the generally "in-line" arrangements such as in FIGS. 1 and 2. The arrangement of FIG. 23a is applicable to either the inlet or exit end of ducted fan propulsion units whereas the other end may have a same or different arrangement Shown at 2301 is a ducted fan propulsion unit similar to the one shown in FIG. 2, except that rows of vanes are arranged in "pie slice" segments 2302 of the duct, where the vanes in each slice, preferably being substantially perpendicular to the bisecting radius of the segment, span the slice from edge to edge to common supports 2304 for the vanes, said supports being aligned radially relative to the center of the duct. The number of segments can vary, but typical of this arrangement is between 4 and 8 segments, with 8 shown for illustration purposes in FIG. 23*a*, FIG. 23*b* illustrates any one of eight cross sections in FIG. 23*a* that could be done perpendicular to the vanes. As shown schematically, the upper vanes are optionally tilted as in FIG. 21, while the lower vanes are shown as in FIG. 22*a*. It should be appreciated that the total tilt is a combination of the tilt for 'zero' position to align with the local flow, and the tilt to each side typically up to stall, about 10-12 degrees, to perform its function as a control vane. It should be further noted that a disposition of vanes as shown in FIG. 23*a* has an additional benefit where, selective rotation of the lower (exit) vanes in a manner very similar to that shown in FIG. 22*c* may be used to concentrically control the expansion or contraction of the diameter of the slipstream wake downstream of the duct which affect the average velocity of the wake with corresponding influence on the pressure acting upstream on the exit section of the duct also having an effect on the overall lift performance of the duct. Potential benefits of said control system are reduction of high speed flow area of the wake blowing at people or objects on the ground, or alternatively increasing the wake diameter and reducing the airflow to gain additional positive pressure increment acting upward on the duct exit section with a corresponding increase in lift. The vanes can be deflected up to their maximum operating range before vanes stall occurs. It should be further mentioned that the application illustrated in FIG. 23*a* is also valid if non-pivotal vanes are used, to preserve smooth and undetached flow on each such non-pivotal vane as long as means such as air suction or blowing through orifices on the surface of the vanes or piezoelectric actuators or other fluidic control means to avoid separation of the flow on each non-pivotal vane are employed as required by the local streamline direction near each vane. It will also be appreciated that in case the vanes in FIG. 23*a* can be rotated to inclination of a wide angle typically up to 45 degrees or so to either side, it will enable them to substantially align with the combined velocity of the incoming free-stream air and the velocity induced by the duct when the duct is moving forward or sideward, both velocities being substantially perpendicular in direction, and at higher moving speed substantially similar in magnitude. Such wide rotation capability of the vanes would make the arrangement of FIG. 23*a* attractive at both the exit end and at the inlet end of the duct thus improve the sideward and forward flight capability of the ducted fan vehicle. This rotation capability enables the duct to optimally enjoy both the improved sideward and forward flight capability, similar to that of vanes parallel to the longitudinal axis of the vehicle, and the improved flows in vertical flight, as described hereinabove. It should further be noted that once the vanes are rotated to align themselves with the local flow, they can then be further rotated, such as typically up to stall, about 10-12 degrees, to perform the control function, as described hereinabove.

Also, it will be noted that the 'pie slice' arranged vanes, as described hereinabove, at the exit side of the duct which are substantially perpendicular to the direction of the flight can for higher flight speeds be further rotated beyond the 45 degrees inclining the flow stream at the exit from the duct further backwards in order to reduce the momentum drag.

It should be further appreciated that the typical up to 10-12 degree angle described herein is characteristic of vanes that are typically at distance from each other of one chord length. When the distance between the vanes is controlled and becomes smaller, whether predetermined or variable along the supports of the vanes, the stall angle may become higher typically up to 30 degrees with corresponding increase in expansion of the wake.

Thus, the present invention described hereinabove with reference to FIGS. 1-21 may employ the vane configuration described with reference to FIGS. 22-23, in which the vehicle of FIGS. 1-21 includes:

A VTOL vehicle comprising: a vehicle frame; a duct carried by the vehicle frame with the longitudinal axis of the duct perpendicular to the longitudinal axis of the vehicle frame; a propeller rotatably mounted within the duct about the longitudinal axis of the duct to force an ambient fluid through from its inlet at the upper end of the duct through its exit at the lower end of the duct, and thereby to produce an upward lift force applied to the vehicle; and a plurality of spaced vanes, such as having an airfoil cross section or an elliptical cross section, selectively pivotally or non-pivotally or their combination, mounted to and across the inlet end of the duct either about and substantially parallel to said longitudinal axis of the vehicle frame or arranged in "pie slice" segments of the duct, where the vanes in each slice preferably being substantially perpendicular to the bisecting radius of the segment, and span the slice from edge to edge, the vanes pivoting and/or having means of affecting the ambient fluid either through the vanes or in vicinity of vanes, thereby affecting flow around the vanes to generate desired horizontal force component to the lift force applied to the vehicle; and similar vanes arranged in "pie slice" segments of the duct, where the vanes in each slice preferably being substantially perpendicular to the bisecting radius of the segment, and span the slice from edge to edge, said arrangement located at the exit end of the duct.

It will be appreciated that any of the foregoing arrangements may be used in any of the above-described air vehicles to produce the desired control forces in addition to the lift forces. The vanes are not intended to block air flow, but merely to deflect air flow to produce the desired control forces as well as improve flight and hover capabilities of the vehicle. Accordingly, in most applications the pivotally mounted vanes, after reaching the zero position, would be designed to be pivotal no more than typically up to about 10-12 degrees in either direction, which is the typical maximum angle attainable before flow separation. The non-pivotal vanes would be designed with their cross section longitudinal axis substantially parallel to the longitudinal axis of the duct and preferably adjusted to variations in local flow angularity, either through mounting of the complete vane at an angle to the longitudinal axis of the duct, or by using a vane that is twisted along its longitudinal axis, or alternatively the non-pivotal vanes are arranged in 'pie slice' segments of the duct, to match with greater accuracy the local angularity of the incoming or outgoing flow, or by combining both angular mounting and built-in twist as required for generating in the most effective manner the side forces to produce desired forward, aft, left and right translation movements, as well as yaw, pitch and roll rotary movement of the vehicle, and also its enhanced lift performance far from ground and improved ground effect behavior, and improved forward flight and side movement.

Since the control forces and moments are generated by horizontal components of the lift forces on the vanes themselves, the vanes should preferably be placed on the intake side of the propeller as far from the center of gravity of the vehicle as possible for creating the largest attainable moments. The same applies if vanes are provided on the exit side of the ducts.

While the invention has been described above particularly with respect to air vehicles, it will be appreciated that the invention, or various aspects of the invention as described above, can also be advantageously used with other types of vehicles such as sea vehicles, to provide propulsion and directional control to the vehicle.

Accordingly, while the invention has been described with respect to several embodiments, it will be understood that these are set forth merely for purposes of example, and that many other variations, modifications and applications of the invention may be made.

What is claimed is:

1. A method of improving aerodynamic flow through a ducted fan of a Vertical Take Off and Landing (VTOL) vehicle when the VTOL vehicle is in proximity to the ground, the ducted fan comprising an open-ended duct, having an inlet end and an outlet end; a propeller mounted within said duct between said inlet and outlet ends; and a first plurality of vanes extending across the inlet end of the duct; the method comprising:
   (a) adding a second plurality of vanes across the outlet end of the duct, said second plurality of vanes being pivotally adjustable about axes parallel to longitudinal axes of said second plurality of vanes; and
   (b) pivotally adjusting at least some of said second plurality of vanes to substantially match angularity of flow exiting the duct caused by the flow impinging on the ground.

2. The method of claim 1, wherein step (a) is carried out by arranging all of said second plurality of vanes parallel to each other.

3. The method of claim 1 wherein step (a) is carried out by arranging said second plurality of vanes in pie-slice-shaped segments about a center axis through the duct.

4. The method of claim 3 wherein said second plurality of vanes are arranged in 4 to 8 segments.

5. The method of claim 3 wherein step (b) is carried out by adjusting vanes of said segments concentrically.

6. The method of claim 3 wherein, for each segment, the vanes are substantially perpendicular to a bisecting radius of the segment.

7. The method of claim 3 wherein step b) is carried out by pivotally adjusting said second plurality of vanes up to a degree sufficient to enable said second plurality of vanes to substantially align with a combined velocity of incoming free-stream air and velocity induced by said duct when said duct is moving forward or sideward.

8. The method of claim 7 wherein step (a) is carried out by also arranging said first plurality of vanes in pie-slice-shaped segments about said center axis and wherein step (b) is carried out by pivotally adjusting both said first and second pluralities of vanes up to at least about 45.degree. to thereby enhance sideward and forward flight capability of said vehicle.

9. The method of claim 3 wherein step (b) is carried out by selectively rotating vanes of said second plurality of vanes to concentrically control expansion or contraction of the diameter of a slipstream wake downstream of said duct.

10. The method of claim 1 further comprising:(c) twisting at least some of said first plurality of vanes in areas adjacent a peripheral edge of the duct to adjust their respective planes of symmetry to local variations in flow into the inlet end of the duct.

11. The method of claim 1 wherein each of said second plurality of vanes is provided with an individual adjustment actuator.

12. The method of claim 1 wherein said second plurality of vanes are adjustable in clusters.

13. The method of claim 1 wherein step (b) is carried out by adjusting plural vanes in each of said first and second pluralities of vanes.

14. A method of improving aerodynamic flow through a ducted fan of a VTOL vehicle when the VTOL vehicle is in proximity to the ground, the ducted fan comprising an open-ended duct, having an inlet end and an outlet end; a propeller mounted within said duct between said inlet and outlet ends and a first plurality of vanes extending across the inlet end of the duct; the method comprising:(a) adding a second plurality of vanes across the outlet end of the duct; and(b) providing means for adjusting flow along said second plurality of vanes to substantially match angularity of flow exiting the duct caused by the flow impinging on the ground.

15. A vehicle comprising:
   a vehicle frame;
   a duct carried by the vehicle frame with the longitudinal axis of the duct perpendicular to the longitudinal axis of the vehicle frame;
   a propeller rotatably mounted within the duct about the longitudinal axis of the duct to force an ambient fluid therethrough from its, inlet at the upper end of the duct through its exit at the lower end of the duct and thereby to produce an upward lift force applied to the vehicle;
   a first plurality of spaced vanes mounted to and across the inlet end of the duct about pivot axes perpendicular to the longitudinal axis of the duct and selectively operational to produce a desired horizontal control force in addition to the lift force applied to the vehicle; and
   a second plurality of vanes across the outlet end of the duct, selectively rotatable to align substantially with transverse outflow stream lines extending in outward directions caused by flow impinging on ground proximate the outlet end of the duct to thereby prevent separation of the flow on said second plurality of vanes and retain the control effectiveness of said plurality of vanes near the ground.

16. The vehicle of claim 15 wherein said first and second plurality of vanes are arranged substantially parallel to a longitudinal axis of the vehicle.

17. The vehicle of claim 15 wherein one of said first and second plurality of vanes are arranged in pie-slice-shaped segments about a center axis of the duct.

18. The vehicle of claim 17 wherein said one of said first and second plurality of vanes comprises said second plurality of vanes.

19. The vehicle of claim 17 wherein said second plurality of vanes are arranged in 4 to 8 segments.

20. The vehicle of claim 15 wherein said second plurality of vanes are individually adjustable.

21. The vehicle of claim 15 wherein clusters of said second plurality of vanes are separately adjustable.

22. The vehicle of claim 17 wherein vanes of each segment are substantially perpendicular to a bisecting radius of the segment.

23. A vehicle comprising:
   a vehicle frame;
   a duct carried by the vehicle frame with the longitudinal axis of the duct perpendicular to the longitudinal axis of the vehicle frame;
   a propeller rotatably mounted within the duct about the longitudinal axis of the duct to force an ambient fluid therethrough from its inlet at the upper end of the duct through its exit at the lower end of the duct, and thereby to produce an upward lift force applied to the vehicle;

a first plurality of spaced vanes mounted to and across the inlet end of the duct about pivotal axes perpendicular to the longitudinal axis of the duct and selectively operational to produce a desired horizontal control force in addition to the lift force applied to the vehicle;

a second plurality of vanes across the outlet end of the duct; and means for influencing flow across said second plurality of vanes to reduce separation of flow from said vanes as required by local streamline direction near each said vane under conditions when flow exiting the duct impinges on the ground.

24. The vehicle of claim 23 wherein vanes in said second plurality of vanes are non-pivotal.

25. The vehicle of claim 23 wherein said first and second plurality of vanes are arranged substantially parallel to a longitudinal axis of the vehicle.

26. The vehicle of claim 23 wherein one of said first and second plurality of vanes are arranged in pie-slice-shaped segments about a center axis of the duct.

27. The vehicle of claim 26 wherein said one of said first and second plurality of vanes comprises said second plurality of vanes.

28. The vehicle of claim 26 wherein vanes of each segment are substantially perpendicular to a bisecting radius of the segment.

29. The vehicle of claim 26 wherein vanes of said second plurality of vanes are each pivotally adjustable at least to about 45°.

30. The vehicle of claim 26 wherein both said first and second plurality of vanes are arranged in pie-slice-shaped segments about a center axis of the duct, and wherein vanes of said first and second plurality of ducts are each pivotally adjustable at least to about 45°.

* * * * *